Jan. 29, 1946.   L. F. NENNINGER ET AL   2,393,928
CONTROL MECHANISM FOR MILLING MACHINES
Filed Dec. 20, 1943   5 Sheets-Sheet 1

INVENTORS,
LESTER F. NENNINGER
FRED A. HASSMAN
BY
Leigh W. Wright
ATTORNEY.

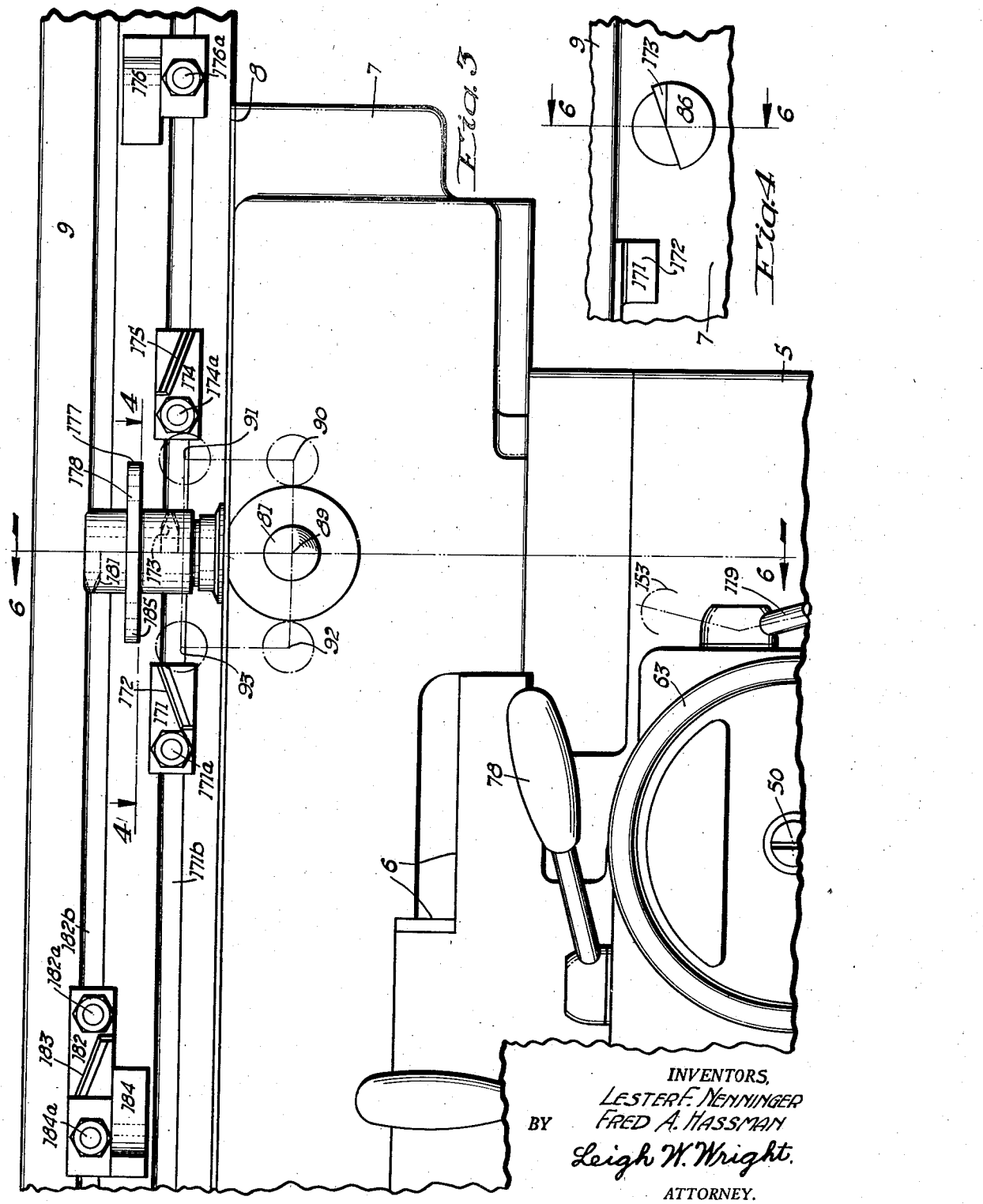

Jan. 29, 1946.  L. F. NENNINGER ET AL  2,393,928
CONTROL MECHANISM FOR MILLING MACHINES
Filed Dec. 20, 1943  5 Sheets-Sheet 3
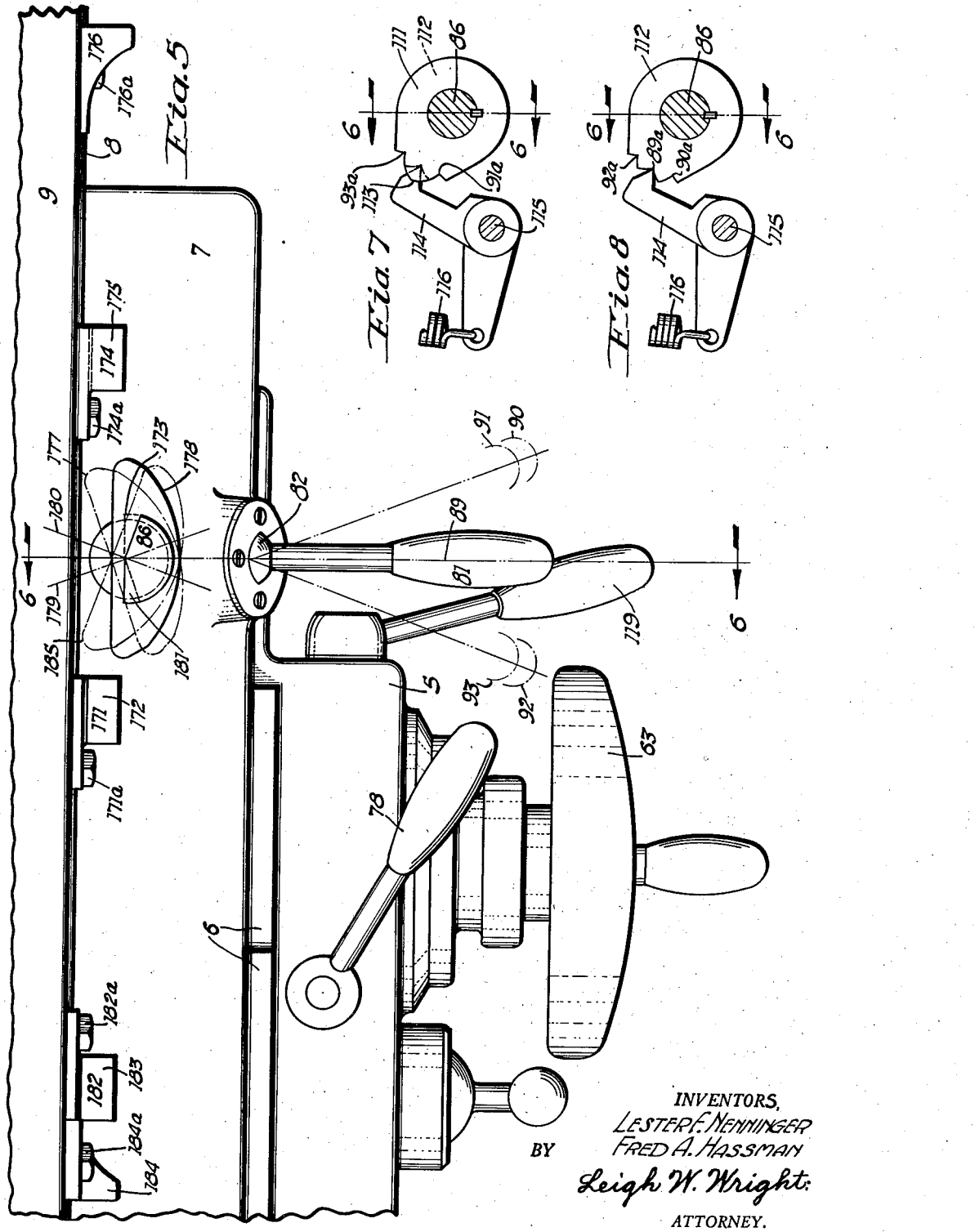
INVENTORS,
LESTER F. NENNINGER
FRED A. HASSMAN
BY Leigh W. Wright
ATTORNEY.

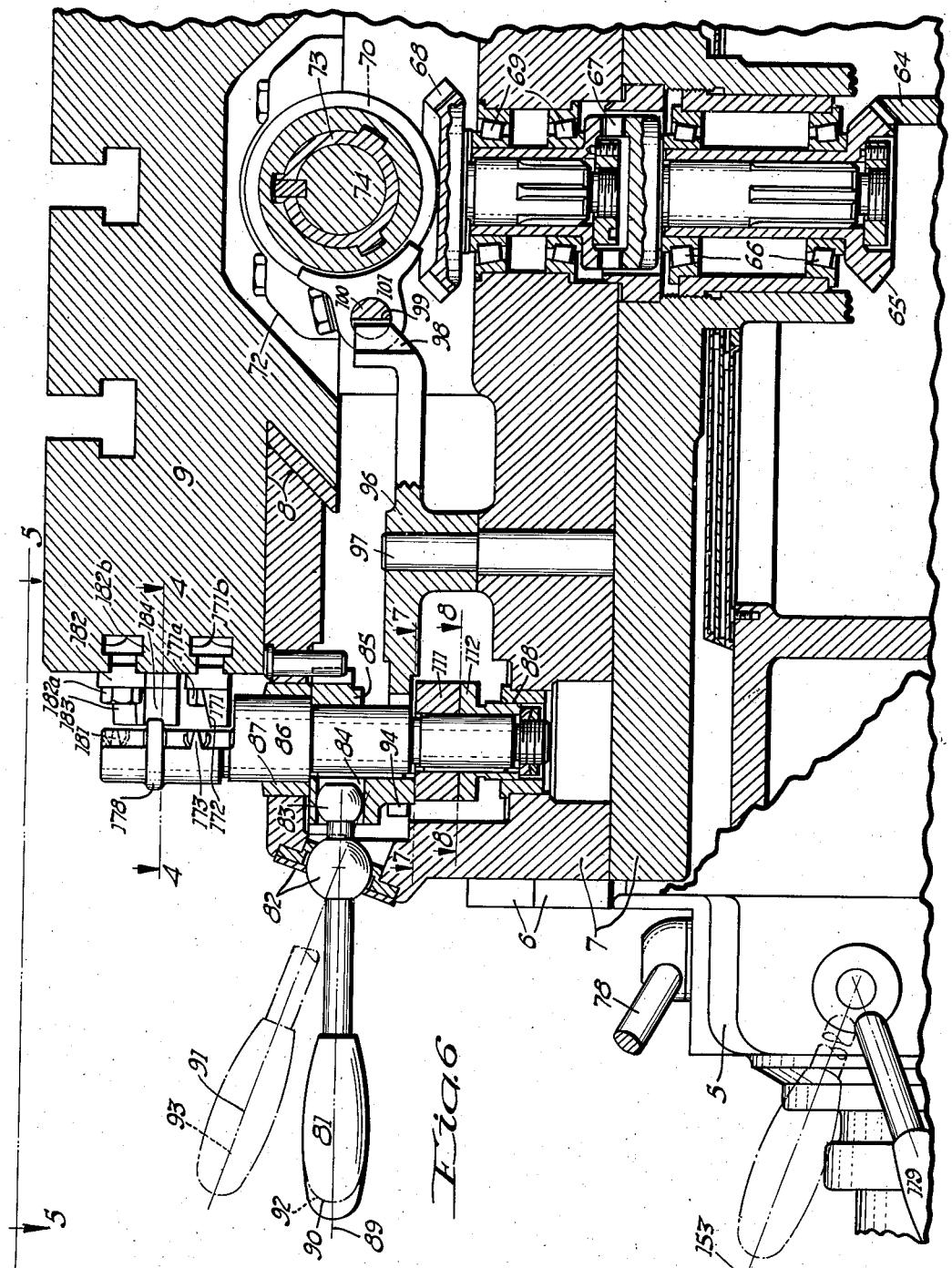

Patented Jan. 29, 1946

2,393,928

UNITED STATES PATENT OFFICE 2,393,928

CONTROL MECHANISM FOR MILLING MACHINES

Lester F. Nenninger and Fred A. Hassman, Cincinnati, Ohio, assignors to The Cincinnati Milling Machine Co., Cincinnati, Ohio, a corporation of Ohio Application December 20, 1943, Serial No. 515,046

15 Claims. (Cl. 90—21)

This invention relates to machine tools and is particularly directed to improvements in feed and rapid traverse control mechanism for effecting the relative movement of the cutter and work in milling machines.

It is, therefore, one of the objects of this invention to provide improvements in a feed and rapid traverse control mechanism for a milling machine.

It is a further object to provide an improved control apparatus for a milling machine having a plurality of operating control levers in which each lever has the same constant uniform operating characteristics in effecting actuation of each machine member individually, or any group of machine members simultaneously.

Still another object is to provide an improved hydraulically operated control mechanism under automatic or manual actuation for effecting the feed and rapid traverse movements of a milling machine which is highly sensitive, rapid and accurate in operation and which requires a minimum of uniform effort on the part of the operator, when actuated manually.

And another object is to provide a hydraulically operated control mechanism under automatic dog control and a plurality of uniformly operative manual controls, in which the hydraulic control mechanism may be operated directly by one of the manual control means and also by a second manually operated remote control means, the latter of which in turn may be rendered effective by still a third manually operated remote control means, all of which controls are suitably interconnected to prevent inadvertent operation of the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a left side elevational view of a typical knee and column type milling machine to which this invention may be applied.

Figure 2 is a diagrammatic showing of a typical feed and rapid traverse control cycle which may be effected with this invention.

Figure 3 is a fragmentary, enlarged front elevational view, indicated by the line 3—3 in Figure 1, of the front of the knee, saddle, and table of the machine.

Figure 4 is a fragmentary plan view, partly in section, on the line 4—4 of Figures 3 and 6.

Figure 5 is a fragmentary enlarged plan view of the front of the knee, saddle, and table shown in Figure 3.

Figure 6 is a fragmentary vertical transverse section on the line 6—6 of Figures 3, 5, 7, and 8.

Figure 7 is an enlarged section on the line 7—7 of Figure 6.

Figure 8 is an enlarged section on the line 8—8 of Figure 6.

Figure 9:
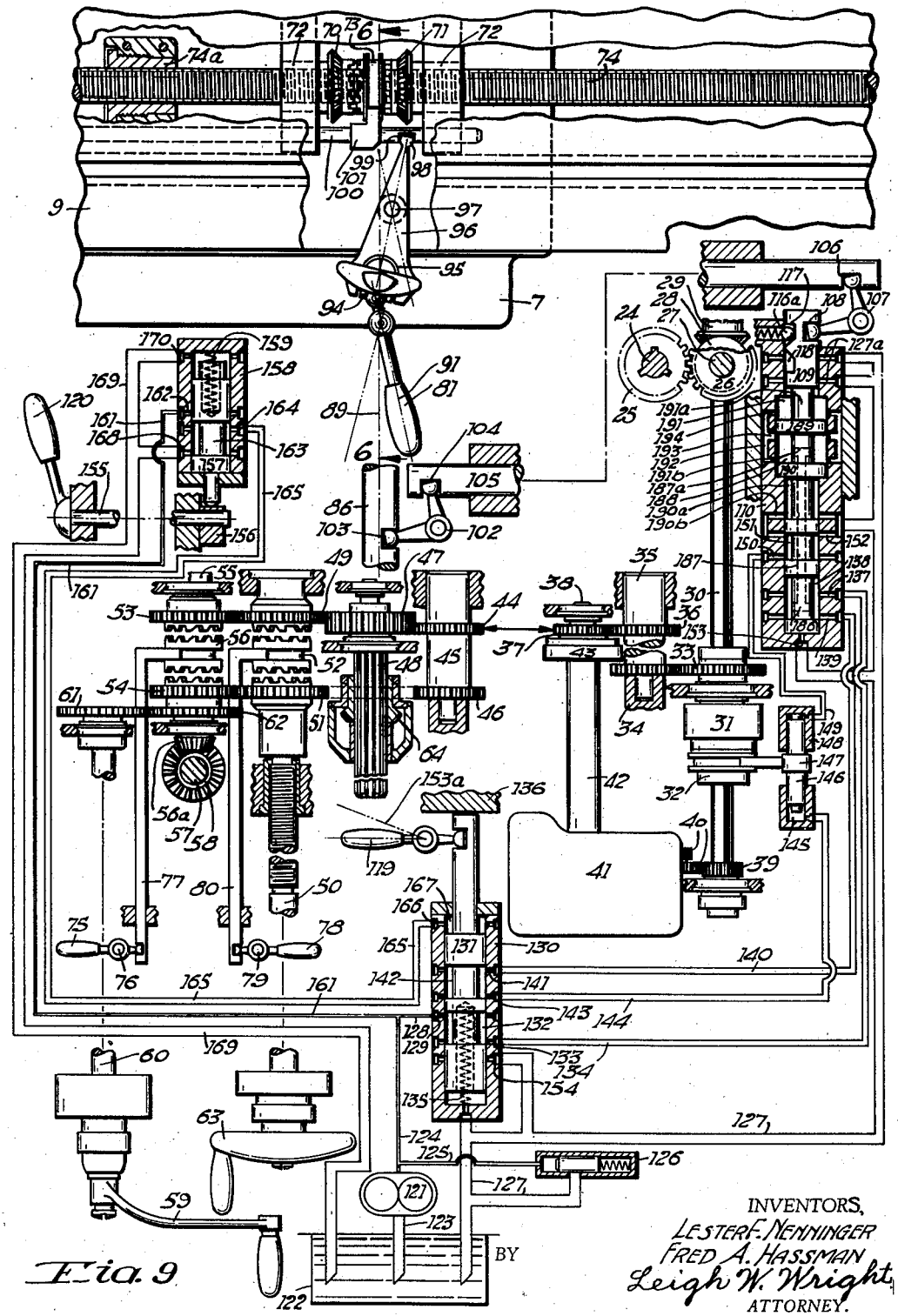
Figure 9 is a diagram illustrating the feed and rapid traverse drive to the work carrying members and associated hydraulic control mechanism.

As an example of a machine tool which has a plurality of different character work carrying members which are to be moved at varying rates relative to a cutting tool, there is illustrated a milling machine, Figure 1, having a base 1 upon which is integrally mounted the usual column 2 in which is journaled the cutter spindle 3. On suitable guideways 4 is vertically reciprocably mounted the knee 5 and on top of which, on appropriate guideways 6, is slidably mounted the saddle 7 for horizontal movement in and out with respect to the column 2. On top of the saddle 7 slidably mounted on guideways 8 is the work table 9 which also is movable horizontally but transverse to the direction of relative movement of the saddle on the knee.

The main driving power for operating the machine is preferably derived from a prime mover or main drive motor 10 suitably mounted on a supporting plate 11 attached to the column 2 of the machine and which has a driving pulley 12 over which operate suitable belts 13 to convey power from the motor 10 to the main drive pulley 14. The work spindle 3 is driven from the pulley 14 through a suitable change speed transmission located in the column 2 as indicated generally at 15, but, since this transmission forms no part of the present invention, a further detailed description thereof will not be undertaken.

Power for effecting the feed and rapid traverse movements in the knee 5, the saddle 7, and the table 9 is also derived from the main drive motor 10 which is normally continuously operating when the machine is in use. On an extension 14a of the pulley 14 is fixed a gear 16 which is continuously rotated by the motor 10 and which gear, in turn, drives a mating gear 17 carried on a shaft 18 journaled in the column 2 of the machine. On the outer end of the shaft 18 is fixed a suitable bevel gear 19 which drives a mating bevel gear 20 fixed to a stub shaft 21 journaled in the column 2, upon the upper end of which is a gear 22 which is in mesh with another gear 23 journaled against axial movement in the column 2 and from which downwardly extends a splined drive shaft 24 rigidly connected to the gear 23 so that it may be rotated thereby but held against axial movement with respect to the column 2.

The downwardly extending drive shaft 24 slidingly engages in a suitably splined bore in a gear 25, Figure 9, journaled against axial movement in the knee 5 so that the gear may be at all times driven from the main drive motor 10 for any position of relative movement of the knee up and down on the ways 4 of the column 2. It will be noted that the gear 25, in turn, drives a gear 26 fixed on a stub shaft 27 journaled in the knee 5, upon which shaft is also fixed a bevel gear 28 which drives a mating bevel gear 29 fixed to the power input shaft 30 of the knee transmission.

By connecting power from the shaft 30 directly to the knee, saddle and table elements, rapid traverse movements are thus effected in these members and by taking power from the shaft 30 through a change feed transmission or feed box a series of desired slower feed rates for these members may thus be effected. The rapid traverse power takeoff from the shaft 30 consists of providing a multiple disc friction clutch 31 which may be connected or disconnected in driving relationship with the shaft 30 by its actuating spool 32, whereupon a gear 33, normally freely journaled for rotation relative to the shaft 30, may be connected or disconnected in driving relationship with the shaft 30. Driving power from the gear 33 is transmitted to a gear 34 fixed to an intermediate shaft 35 journaled in the knee 5 to which is also rigidly fixed in driving relationship with the gear 34, a gear 36 which drives the common feed and rapid traverse gear 37 carried on an appropriate shaft 38 journaled in the knee 5 of the machine.

Feed driving power takeoff is provided by the gear 39 fixed on the drive shaft 30 which, through appropriate gearing indicated generally at 40, drives the feed box transmission 41 so as to effect a plurality of relatively slow predetermined feeding rates for the output shaft 42 of the feed box. The shaft 42 is connected to drive the gear 37 and shaft 38 through an overrunning clutch 43 in such a fashion that the gear 37 may be rotated at a more rapid rate than the rate at which it may be rotated by the feed box 41 when the rapid traverse clutch 31 is engaged. However, when the rapid traverse clutch 31 is disengaged the drive from the feed box output shaft 42 automatically takes up the driving of the gear 37 at the predetermined slower feeding rate desired through the overrunning clutch 43. Thus at any time the rapid traverse drive may be superimposed upon the normal feed drive by engagement of the clutch 31 to accelerate the actuated work carrying member at a rapid traverse speed and then the rapid traverse movement may be discontinued and the feed automatically take up a slow feeding movement for these members.

Feed and rapid traverse power may be transmitted from the common gear 37, Figure 9, in reversible directions to, or disconnected from, the knee, saddle, and table work feeding members. The gear 37 is in driving connection with a gear 44 fixed to a shaft 45 appropriately journaled in the knee 5 to which is also fixed in driving relationship a similar gear 46. The gear 44 drives, through a gear 47 fixed on the table drive shaft 48 journaled in the knee 5, a gear 49 journaled on the saddle cross feed screw shaft 50, while the gear 46 on the shaft 45 directly drives a gear 51 also journaled on the cross feed screw shaft 50. Thus, it can be seen that the gears 49 and 51 may be rotated at the same speed but in opposite directions. A suitable reversing clutch 52 fixed to the cross feed screw shaft 50 may be engaged in the conventional manner with the gear 49 or the gear 51 or moved to a neutral position to connect driving power for rotating the saddle cross feed screw 50 in one direction or the other or to stop any rotation thereof.

It will be noted also that the gear 49 drives a gear 53 while the gear 51 drives a gear 54, both of which gears 53 and 54 are journaled on the elevating drive shaft 55 and may be connected in driving relationship therewith or disconnected therefrom by means of an appropriate reversing clutch 56, so that the shaft 55 having a bevel gear 56a driving the elevating screw 57 associated with the elevating nut 58 fixed to the base of the machine may effect raising and lowering of the knee 5 on the column 2.

The knee 5 may be raised and lowered manually, Figure 9, by means of the hand crank 59 on the hand actuating shaft 60 having a gear 61 which drives a gear 62 fixed to the shaft 55. Also, the saddle cross feed screw 50 for moving the saddle in and out may be actuated manually by means of a suitable hand wheel 63 fixed on the saddle cross feed screw 50.

The work table 9 is driven from the gear 47 fixed to the table drive shaft 48, the shaft 48 being provided with appropriate splines slidable in driving relationship in a mating bore of a bevel gear 64 to permit driving of this bevel gear for any position of relative movement of the saddle on the knee. The gear 64 drives a mating bevel gear 65, Figure 6, appropriately journaled on suitable bearings 66 in the saddle 7 of the machine and through a suitable interlocking driving connection 67 drives a bevel pinion 68 appropriately journaled in suitable bearings 69 in the saddle 7.

The bevel gear 68 is in continuous driving relationship with the reversing bevel pinions 70 and 71, Figure 9, which are appropriately journaled in suitable bearings 72 against axial movement in the saddle 7. In between the bevel gears 70 and 71 is a reversing clutch 73 which is axially slidable in driving relationship on the table feed screw 74 so that one or the other of the bevel gears 70 or 71 may be connected to rotate the screw 74 or moved to a neutral position to arrest rotation thereof. The screw 74 is journaled against axial movement at each end of the table 9 and operates in a suitable nut 74a fixed to the saddle 7, Figure 9, in a conventional manner not shown so that rotation of the screw 74 effects the sliding movement of the table on the ways 8 of the saddle 7. A suitable hand wheel 74a, Figure 1, may be utilized for manual rotation of the screw 74.

The connecting or disconnecting of power for elevating the knee and for reversing this power is accomplished by manipulating the vertical movement control lever 75, Figures 1 and 9, appropriately mounted on a rock shaft 76 carried in the knee which actuates the shifter rod 77 connected to the reversing and stop clutch 56. The saddle cross travel is similarly put into motion, stopped, or reversed, by means of the saddle control handle 78, Figures 1, 3, 5, 6 and 9, appropriately mounted on a suitable rock shaft 79 also journaled in the knee 5 and which actuates a shifter rod 80 connected to the clutch 52.

The connecting or disconnecting of the clutch member 73, Figures 6 and 9, for effecting the driving of the table feed screw 74 in one direction or the other, or to stop its rotation is accomplished by actuating the combined feed and rapid traverse control lever 81 which is journaled universally by a suitable ball and socket mounting 82 in the front portion of the saddle 7 and has on its inner end ball-shaped projection 83 operating in a bore 84 of an actuating cam member 85 fixed to the vertically mounted trip plunger 86 journaled in suitable bearings 87 and 88 for both vertical reciprocating movement and rocking movement in the saddle 7. The control lever 81 has a series of five operative positions as best shown in Figure 3 comprising a neutral or inoperative position 89, a feed right position 90, a rapid traverse right position 91, feed left position 92, and a rapid traverse left position 93. The cam member 85 has a lug portion 94 which operates in a stop portion 95 in the clutch actuating lever 96 pivotally mounted on a suitable pin 97 carried in the saddle 7 and having a portion 98 operating in a suitable slot 99 in the shifter rod 100 axially slidable in the knee 5. On the rod 100 is mounted a shifter fork 101 engaging the clutch spool 73 so that when the lever 81 is moved from the position 89 to positions 90 or 92 the clutch member 73 will likewise be moved to engage bevel gear 71 or 70 respectively to institute feed movement to the right or left for the work table 9 upon rotation of the screw 74 by the bevel gears 70 or 71.

When the control lever 81 is moved from position 90 to position 91, or from position 92 to potion 93, rapid traverse movements are transmitted to the gears 70 and 71 for rapid actuation of the screw 74. These movements of the handle 81 actuate the rapid traverse clutch 31, Figure 9, through a specially arranged hydraulic actuating and control system. The vertical movement of the lever 81 in the positions 90—91 or 92—93 effect corresponding vertical axial reciprocating movement in the trip plunger 86 which movement is conveyed by any suitable means such as the mechanism illustrated diagrammatically in Figure 9, comprising the bell crank lever 102 having one arm operating in a notch 103 formed in the trip plunger 86 and the other arm operating in a notch 104 in the actuating rod 105, the other end of which rod has a notch 106 in which one arm of the bell crank lever 107 operates and its other arm operating in the notch 108 formed in the plunger 109 of the main fluid pressure control valve 110 for the rapid traverse movements. The control lever 81 may also be moved from position 91 to 93 or vice versa so as to effect reversal of the rapid traverse movement.

The various positions 89, 90, 91, 92 and 93 for the handle 81 are controlled by detent mechanism illustrated particularly in Figures 6, 7 and 8. On the bottom portion of the trip plunger 86 is fixed a detent cam 111 for controlling the rapid traverse positions 91 and 93 for the control lever 81 and fixed on the plunger 86 directly below this cam is an associated detent cam 112 for controlling the feed and stop positions 90, 89 and 92 for the lever 81, both of which cams are respectively engaged by the spring urged detent pawl 114 carried on a suitable pivot 115 and actuated by a suitable spring 116 carried in the saddle of the machine, Figures 7 and 8. It will be noted that the cam 112 has three positions, 89a, 90a and 92a, corresponding to the three positions 89, 90 and 92. The detent cam 111 has two positions, 91a and 93a, corresponding to the two rapid traverse positions 91 and 93. It will also be noted that on the detent cam 111 is a peak portion 113 which obscures the portion 89a of the cam 112 so that the control lever cannot be stopped at an intermediate or neutral position while in rapid traverse position 91—93 and thus prevent operation of the machine in this position. The up and down positions 90—92 and 91—93 of the lever 81 maintained by a suitable ball detent 116a, Figure 9, operating in appropriate slots 117 and 118 in the valve plunger 109 serves to position the lever 81 in its vertical movements. These various detents 111, 112 and 116a will obviously cause automatic load-and-fire shifing of the handle 81 to any of its five operative positions, upon initiation of the movement by the handle 81, and will maintain the handle 81 in any of its shifted positions.

Normally, in the operation of a friction type rapid traverse clutch of the character of the clutch 31 by direct manual effort, it has been found that a great variation in the effort required to engage or disengage the clutch is present when the knee is traversed up or down and when the saddle or table are connected for the traversing motion. This, of course, is due to the different characteristics and direction of movement of the various work carrying members of the milling machine. For instance, in rapid traversing the knee 5 upwardly, a relatively great pressure is required in the friction clutch 31 to hold it in proper engagement to effect rapid traverse movement and to then disconnect it whereas in lowering the knee at relative traverse movement, little effort is needed to actuate this clutch 31. Likewise, the saddle and table members being of different weight and character of movement require a still different type of manual operation of the clutch 31 to hold it in proper engagement or to disengage it with the desired accuracy of stopping as is particularly required when moving the work and cutter into proper cutting position. This condition of manual variation in the control characteristics is especially apparent when the knee, saddle and table are to be traversed simultaneously or in pairs in setting up the machine with the selecting levers 75, 78 and 81, Figure 9, all placed in operative positions at the same time.

It is, therefore, the purpose of this invention to provide an actuating mechanism for the rapid traverse clutch 31 which is accurate and positive in engaging and disengaging the clutch 31 regardless of whether the knee, saddle, or table are being rapid actuated, either separately or simultaneously, so that the same characteristics of traverse movement and traverse movement stoppage takes place for these members for any direction of their traverse movement. It is also the purpose to provide this mechanism with characteristics such that the manual manipulation and instituting of this actuating control for the rapid traverse clutch always has the same feel and control characteristics to the operator when effecting rapid traverse movements, irrespective of what combination of work carrying members of the machine is operated and independent of any characteristics of the work piece placed upon these members or other frictional changes which may result in the machine due to its general structure and adjustment.

In order to obtain these desired results it is the purpose to actuate the rapid traverse clutch 31 by fluid pressure means controlled from manual operating leverage, such as a lever 81 which actuates the valve plunger 109 of the valve 110 as set forth above. This main hydraulic control valve 110 functions for purposes of connecting or disconnecting the rapid traverse clutch 31 when feeding power is connected to actuate the table feed screw 74 through the clutch 73. Also in connection with this hydraulic actuating mechanism is provided a supplementary remote control actuated by a handle 119 located on the front of knee 5 which may be manipulated to effect engagement or disengagement of the rapid traverse clutch 31. Thus, when the lever 75 has been actuated to connect driving power with the vertical movement of the knee, rapid traverse movements may be imparted thereto by actuating the lever 119. Similarly, the saddle cross travel movement may be instituted at rapid traverse by appropriately operating the lever 78 and manipulating the control lever 119. It is also the purpose to provide a rear control lever 120, Figures 1 and 9, for the fluid pressure operated rapid traverse mechanism to actuate the clutch 31 which remotely actuates the mechanism controlled by the lever 119 to perform the same functions as that of directly actuating the lever 119.

The fluid pressure control mechanism controlled by the levers 81, 119 or 120 comprises a fluid pressure pump 121, Figure 9, which is driven continuously by a suitable prime mover to withdraw fluid from a reservoir 122 through the suction line 123 and deliver pressure continuously in the pressure line 124. A branch line 125 from the pressure line 124 is connected to a suitable relief valve 126 from which exhaust fluid is expelled through the drain line 127 back to the reservoir 122 to maintain a uniform, safe operating pressure in the hydraulic control circuit. In Figure 9 the various fluid pressure control mechanisms are shown in the operating position when the control lever 81 is in the rapid traverse right position 91 for the work table 9, at which time the clutch 73 is engaged with the bevel gear 71 for rotating the screw 74 for right hand movement of the table 9.

When the lever 81 is moved into the position 91 the plunger 109 of the main control valve 110 is moved to its downward position as shown in Figure 9. Fluid pressure is then transmitted from the line 124 through the branch line 128 into the port 129 of the remote control valve 130 which has a plunger 131 appropriately connected for operation by the lever 119. An annular groove 132 is provided in the plunger 131 which connects port 129 with port 133 to which is connected line 134, the plunger 131 of the valve 130 being normally held in the position shown in Figure 9 by a spring 135 which urges the plunger against a stop surface 136. Pressure is thus transmitted from the line 124 to the line 134 under these conditions and is thus connected to a port 137 of the main control valve 110 and passes through the annular groove 138 formed in the valve plunger 109 and then to the port 139 to which is connected the line 140 connected to the port 141 of the valve 130. This port 141, under these conditions, is connected through the annular groove 142 to the port 143 of the valve 130 to which is connected the line 144 connected to the engaging cylinder 145 of the rapid traverse clutch actuating piston 146 to which is connected a suitable shifter yoke 147 for operating the rapid traverse clutch spool 32. Discharge from the rapid traverse clutch disengaging cylinder 148 passes out through the line 149 to the port 150 in the valve 110, then through the annular groove 151 in the valve plunger 109 through the drain port 152 into the drain line 127 and thereby return to the fluid reservoir 122. In this way the rapid traverse clutch 31 is engaged by fluid pressure in the cylinder 145 when the lever 81 is moved to position 91. Obviously, when the lever 81 is in position 93 it is in the same upward position 91–93 as the position 91 with the same conditions prevailing to maintain the rapid traverse clutch 31 in engagement but with the reversing clutch 73 then in engagement with the gear 70 for the opposite direction of rotation of the table feed screw 74.

When the lever 81 is moved back into non-rapid traverse positions 90 or 92, or in the neutral position 89, the valve plunger 109 is then moved upwardly so that under these conditions fluid pressure from the line 124 is still transmitted through the valve 130 as described into the line 134. The line 134 is now connected through port 137 of valve 110, the annular groove 138 of the valve plunger 109 to the port 150 of the valve 110 and then through the line 149 to the rapid traverse clutch disengaging cylinder 148 so as to disengage the rapid traverse clutch 31. Fluid discharge from the engaging cylinder 145 will pass out through the line 144 and through the valve 130 into the line 140 to the port 139 in valve 110 which at this time is connected through the exhaust port 153 of the valve into the drain line 127 for return of the fluid to the reservoir 122.

Rapid traverse movements may be effected in the knee and saddle by means of the lever 119 when the engaging and reversing levers 75 or 78 respectively are manipulated to connect the drive to these members. Under these conditions the control lever 81 for the table is normally in its neutral position 89 and therefore the valve plunger 109 with the valve 110 is in its upward position, Figure 9. At this time the control lever 119 may be actuated to its rapid traverse position 153a, thereby shifting the plunger 131 of the remote control valve 130 so that fluid pressure from the line 124 and line 128 enters port 129 in the valve and passes the annular groove 142 of the valve plunger 131 to the port 143 and then out through the line 144 to the rapid traverse clutch engaging cylinder 145 to actuate the rapid traverse clutch 31 connecting the rapid driving power to the knee or saddle in either direction depending upon the setting of the respective levers 75 and 78. Exhaust fluid at this time passes out from the disengaging cylinder 148 through line 149 to the port 150 of the valve 110, then through the annular groove 138 of the valve stem 109 to the port 137 of this valve out through the line 134 to the port 133 in the remote control valve 130. At this time the annular groove 132 of the valve plunger 131 is connected to an exhaust port 154 of the valve 130 which is connected to the drain line 127 for return of fluid exhaust from the cylinder 148 to the reservoir 122. Release of the lever 119 when in the rapid traverse position 153 permits it to automatically return to the normal position shown in Figure 9 under the influence of the actuating spring 135. Thus the rapid traverse clutch 31 may be operated by the lever 119 in such a way that the effort required to actuate the lever 119 is very small and a nicety of control of the clutch 31 can thus be readily obtained. Furthermore, the effort required to operate the lever 119 is substantially the same as that required to operate the lever 81 from position 90—92 to position 91—93 or return so that both of these rapid traverse initiating levers have the same operating characteristics.

It is important to note that the two control valves 110 and 130 are interlocked to prevent any improper operation of the machine in the event both of the control levers 81 or 119 are operated simultaneously. For example, should the lever 81 be in position 91 or 93 and the lever 119 operated to its rapid traverse position 153, no inadvertent operation would take place as, under these conditions, pressure from the line 124 and 128 enters the valve 130 through the port 129 and goes out through the port 143 into line 144 to move the rapid traverse clutch 31 into connected position, but since this operation has already been effected by the valve 110 there would be no readjustment of the parts as previously set by the control lever 81. The drain line 149 from the disengaging cylinder 148 of the rapid traverse clutch 31 would likewise be connected to port 150 of valve 110 and through the annular groove 151 of valve stem 109 to the exhaust port 152. Also line 140 at this time is closed off at port 141 of valve 130 and its other end is connected to port 139 of valve 110 which, through the channel 138 of valve plunger 109, is connected to the line 134 connected to port 133 in valve 130 which at this time is connected through the channel 132 to the exhaust port 154. Thus, no inadvertent action takes place in these two hydraulic valves 110 and 130, whether one or both are operated simultaneously.

Usually, in the operation of a milling machine it is desirable to operate the various work carrying members from a position at the front of the machine for certain types of work and from a position at the rear of the work table and adjacent the left side of the column when doing other types of work pieces which cannot be properly observed from the normal operating position in the front of the machine. In order to provide additional facilities for initiating the rapid traverse movement from a position at the rear of the machine, the control lever 120 is provided which is mounted on a rock shaft 155, Figures 1 and 9, journaled at the rear of the knee 5 of the machine and carrying on its inner end a suitable actuating cam 156 engaging the end of a valve plunger 157 of a second remote control valve 158. The lever 120 normally is in an inoperative position, as shown, effected by the compression spring 159 of the valve 158 which urges its plunger normally downward as shown in Figure 9 against the cam 156 to hold the lever 120 in the inoperative position. When the lever 120 is moved to the rapid traverse position 160, Figure 1, the plunger 157 of the valve 158 will be moved so as to permit fluid pressure from the line 124 and 161 connected to the port 162 of this valve to pass through the annular groove 163 of the plunger 157 to the exhaust port 164 and then out through the line 165 which is connected to the port 166 of the valve 130, setting up operating pressure in the chamber 167 behind the plunger 131 to force it to rapid traverse position, compressing the spring 135 and at the same time moving the control lever 119 to the rapid traverse position 153, thus causing the valve 130 to effect the same function as it would effect if operated manually by the lever 119 as described. When the lever 120 of the second remote control valve 158 is released the plunger 157 returns to the position shown in Figure 9 so that the fluid pressure from the branch line 161 is cut off at the port 162 and the port 164 of the line 165 is then connected to a port 168 connected to a drain line 169 for return of fluid to the reservoir 122. A drainage port 170 is also connected to the drain line 169 which serves to prevent trapping of fluid in the spring end portion of the cylinder 158 which might otherwise impede its proper operation.

It is to be noted that the two valves 130 and 158 are properly interconnected to prevent improper operation of the machine in the event both of the control levers 119 and 120 are actuated at the same time. For instance, if the lever 119 is in the rapid traverse position 153 and the lever 120 is also moved to its rapid traverse position no improper operation will result since it will merely be a matter of adding fluid pressure in the chamber 167 to the manual pressure applied by the lever 119 in holding the valve plunger 131 down against the spring 135. Likewise, the lever 119 cannot be moved to inoperative or non-rapid traverse position unless the lever 120 is also in its inoperative position because of the continuous application of fluid pressure in the chamber 167 so long as the lever 120 is in rapid traverse position. It is furthermore obvious that the control lever 120 operates with a very minimum of effort since it is merely a matter of manipulating the plunger 157 to institute the rapid traverse movement so that here again the control lever 120 forms a nicety of easy control for the various work moving devices of the machine independent of any variations of power required in moving these members.

It is frequently desirable in machine tools and especially milling machines to have an automatic operating cycle for the work table 9 of the machine. In Figure 2 is illustrated one example of an automatic work cycle which may be effected in the work table 9, it being understood that any variety and sequence of operations may readily be performed by this arrangement without departing from the spirit of the invention. Referring particularly to Figures 3, 5 and 6, the trip plunger 86 is actuated in rocking and up and down axial movement in a predetermined cycle of operation for the machine by the movement of the work table 9. Assuming the work has been properly placed on the table 9 and the cutter spindle 3 started, the operator then moves the control lever 81 out of its neutral position 89 through the feed position 92 up into the rapid traverse position 93 to effect rapid traverse movement of the table 9 toward the left. This motion continues until a feed dog 171, appropriately fixed to the table 9 by a T-slot bolt 171a in the T-slot 171b of the table, has its angular surface 172 engage the actuating tongue 173 of the trip plunger 86. This action raises the plunger 86 upwardly and correspondingly returns the handle 81 from position 93 to position 92 and raising the valve plunger 109 of valve 110 to thus disengage the rapid traverse clutch 31, stopping the rapid traverse movement of the table 9. The overrunning clutch 43 takes up the drive of the table 9 from the feed box 41 to initiate the movement of the table at a feeding rate during which time the actual cutting is being performed on a work piece mounted on the table. After the work surface has been machined, a second rapid traverse dog 174 carried appropriately on the table 9 by a T-slot bolt 174a in the T-slot 171b has its cam surface 175 again engage the actuating tongue 173 of the plunger 86 to again depress it, moving the lever 81 from position 92 to position 93, again operating the rapid traverse clutch 31 as described. Thus, a rapid movement is again instituted in the table 9. Of course, this intermittent feed and rapid traverse movement may be initiated any desired number of times and for any desired periods of application by providing the appropriate number of trip dogs 171 and 174 in instances where intermittent cutting and traversing are required.

At the completion of the last feeding motion and return to rapid traverse as caused by the dog 174, table 9 then continues to proceed to the left at a rapid rate until the reversing trip dog 176 fixed to the table 9 by T-slot bolt 176a engages the end 177 of the wing portion 178 of the trip plunger 86, thus rocking the plunger from the position 179, Figure 5, to the position 180, this motion being assisted in load-and-fire fashion by the rapid traverse detent 111 shown in Figure 7, moving lever 81 into position 91. The table 9 then returns rapidly to the right at a rapid traverse rate until the upper tongue portion 181 of the plunger 86 engages the return feed dog 182 mounted on the table 9 by a T-slot bolt 182a in the T-slot 182b, its cam surface 183 raising the plunger 86 moving the control lever 81 from position 91 to position 90. The rapid traverse movement of the table thus stops, permitting the table 9 to continue to feed to the right until the stop dog 184 fixed to the table 9 by T-slot bolt 184a in the T-slot 182b engages the end 185 of the wing portion 178 rocking the trip plunger 86 to the neutral position 89 with the aid of the notched portion 89a of the feed detent cam 112, Figure 8.

Thus, is illustrated a representative type of automatic cycle of actuation of feed and rapid traverse movements and it will be apparent that in order to institute these movements efficiently, accurately, and without damage to the machine it is necessary to provide mechanism which is free from the influence of variations in the frictional resistance in the movement of the work carrying member of the machine and independent of the variations caused by different types of work pieces being machined. It is, therefore, found that with the above described hydraulic control mechanism for instituting and stopping the rapid traverse mechanism in association with such automatic trip operated control mechanism, a most satisfactory and efficient automatic control for the machine may be provided.

The actuation of the trip plunger 86 in up and down sliding movement to initiate the rapid traverse movement or to stop it effects the actuation of the plunger 109 of the control valve 110. Actuating this mechanism obviously requires a very minimum of mechanical effort and therefore a minimum of friction loss is present and a mechanism of sensitive response to the rapid and easy operation of the plunger 86 in up and down movement results, since this movement of the plunger 86 does not directly apply power for actuating the rapid traverse clutch 31. Therefore, variations in force required to operate the rapid traverse clutch have no effect on the uniformity of operation of the trip plunger 86 under any and all operating conditions.

In order to effect a still more rapid, positive and sensitive operation of this hydraulic control mechanism the valve 110 is arranged with a hydraulic load-and-fire actuating mechanism so that upon initiation of movement of the trip plunger 86 up or down by the trip dogs 171, 174 or 182, the valve will be rapidly moved to its other position under fluid pressure and will likewise rapidly actuate the handle 81 from the feed positions 90—92 to the rapid traverse positions 91—92 or vice versa. This load-and-fire mechanism is shown in Figure 9 in connection with the control valve 110 and comprises a diametral passageway 186 formed in the channel portion 138 of the valve plunger 109 to which is connected the longitudinally extending passageway 187 which communicates with another diametral passageway 187a opening into the annular groove 188 formed by a pair of relatively large spools 189 and 190 which form pistons operating in an enlarged cylinder bore 191 formed in the valve 110.

Taking, for example, the case where the valve 109 is in a rapid traverse position and it is to be moved to a non-rapid traverse position, either by the lever 81 or by one of the trip dogs to stop rapid traverse movement, fluid pressure from the pump 121 passing through the valve 130 into the line 134 enters the port 137 of the valve 110 and the annular groove portion 138 of the valve plunger 109 and through the passageways 186, 187 and 187a of the valve plunger 109 into the chamber 188 formed between the spools 189 and 190. Normally with the valve plunger 109 in a fully operative position as shown in Figure 9, the pressure from the annular groove 188 will be distributed to the port 191b and also to the intermediate port 193 both of which are connected to a passageway 192 formed in the valve 110. Fluid pressure will be delivered from the passageway 192 to a communicating port 194 from which it enters the annular groove 191a formed in the valve stem 109 on the opposite side of the valve spool 189 from the annular groove 188. This fluid pressure acting on the outside area of the spool 189 which is somewhat greater than the normal area of the plunger 109 at the other end of the annular groove 191a serves to maintain the plunger 109 in downwardly shifted position as shown in Figure 9. Thus, no movement will be effected in the plunger 109 at this time. Drainage from the annular groove 190a formed in the valve plunger 109 on the opposite side of the spool 190 from the annular groove 188 is conducted out through an exhaust port 190b to the drain line 127. Also, at this time the drainage ports 127a associated with the annular groove 191a on the other side of the spool 189 are closed off from escape of fluid into the line 127.

As the valve plunger 109 is moved against the fluid pressure in annular groove 191a the spool 189 will momentarily close the port 194, thus cutting off the pressure in this annular groove 191a and also this movement will cause spool 190 to momentarily close port 191b, thus confining pressure to the annular groove 188 between the spools 189 and 190, there being no pressure on the outer sides of either of the spools during the intermediate travel of the valve plunger 109. Further movement of the plunger 109 will ultimately expose the port 194 to the annular groove 188 and the port 191b to the annular groove 190a on the outside of the spool 190 so that pressure will thus be applied from the annular groove 188 through the ports 194 and 193 to passageway 192 and thus out through the port 191b to further rapidly actuate the valve to its new position and maintain it there under hydraulic pressure due to the difference in the areas of the outside of the spool 190 and the plunger 109 adjacent the annular channel 190a. Fluid from behind the spool 189 in the annular groove 191a will be expelled out through the drain ports 127a now exposed to the annular groove 191a from which it is discharged into the drain line 127. Similarly, the reverse operation takes place as the valve is moved downwardly, in which case pressure transfer would again be applied behind the spool 189 as the valve moved downwardly through its intermediate position and relieved from behind the spool 190 for rapid fluid pressure actuation of the valve plunger as described. In this way hydraulic load-and-fire movement of the control valve plunger 109 is obtained for rapidly and accurately initiating or stopping the rapid traverse movements for the table 9.

Thus, is provided in a machine tool, having a plurality of movable members requiring different degrees of effort to move them, a control mechanism to effect feed or rapid traverse movements in any of these members with a minimum of effort and a high degree of accuracy of control and which may be operated manually or by automatic means in a predetermined cycle of operation.

What is claimed is:

1. In a milling machine having a knee, saddle, and table, a main driving motor, a cutter spindle, means for connecting said driving motor to rotate said spindle, transmission mechanism associated with said knee, saddle and table to render the reversible movements thereof relative to said spindle selectively effective, a rapid traverse power transmission operated by said motor, means for connecting or disconnecting said rapid traverse power transmission relative to said knee, saddle, and table transmission, a change feed transmission associated with said knee, saddle, and table transmission, means for driving said change feed transmision from said main drive motor, an overrunning clutch interconnecting said change feed transmission and said knee, saddle and table transmission, whereby the drive from said change feed transmission is automatically rendered ineffective when said rapid traverse transmission is connected to said knee, saddle, and table transmission, power means for operating said connecting and disconnecting means for the rapid traverse transmission, a plurality of fluid pressure operated remote control means for said power means actuable manually or automatically by the relative movements of said knee, saddle, and table, and fluid pressure conducting means interconnected between each of said remote control means so as to prevent inadvertent operation of said machine should more than one control means be operated at a time.

2. In a milling machine having a knee, saddle, and table, a source of power, actuable mechanism selectively reversibly connectable to said knee, saddle, and table, means for normally actuating said selective mechanism in feeding movement from said source of power, means for superimposing a rapid actuating movement on said selective mechanism for the respective member selected to be actuated, fluid pressure operated means for rendering said last-mentioned means effective or ineffective, a plurality of fluid pressure control means for said fluid pressure operated means for effecting rapid movements in each said knee, saddle, or table, and fluid pressure interconnecting mechanism associated with said control means to limit effectiveness thereof to a single control means at any one time.

3. In a machine tool having a plurality of movable members for effecting relative movement of work and tool, a prime mover, actuable means for selectively effecting movement in each of said members, a change feed transmission, an overrunning clutch interconnected between said change feed transmission and said selective actuable means, direct driving means from said prime mover to said selective actuable means, fluid pressure operated means for connecting or disconnecting said direct driving means from said prime mover, fluid pressure control means for said fluid pressure operated means operable with uniform effort for any member of said machine selected to be operated, and a second fluid pressure remote control means operable at a remote point from said first-mentioned control means for rendering said connecting and disconnecting means effective.

4. In a machine tool having a plurality of movable members for effecting relative movement of work and tool, a prime mover, actuable means for selectively effecting movement in each of said members, a change feed transmission, an overrunning clutch interconnected between said change feed transmission and said selective actuable means, direct driving means from said prime mover to said actuable means, fluid pressure operated means for connecting or disconnecting said direct driving means from said prime mover, fluid pressure control means for said fluid pressure operated means, a second fluid pressure remote control means operable at a remote point from said first-mentioned control means for rendering said connecting and disconnecting means effective, and a third fluid pressure remote control means operable to actuate said second fluid pressure control means by fluid pressure.

5. In a milling machine having a knee, saddle, and table, a prime mover, an actuable transmission for said knee, saddle, and table driven by said prime mover, means for reversibly connecting or disconnecting said knee, saddle and table individually or simultaneously to said actuable transmission, means for connecting or disconnecting said prime mover from said actuable transmission, fluid pressure control means for rendering said last-mentioned connecting and disconnecting means operative or inoperative, a second fluid pressure remote control means for operating said last-mentioned connecting or disconnecting means, and a third fluid pressure remote control means for actuating said second-mentioned fluid pressure remote control means by fluid pressure, all of said fluid pressure control means being operable with equal constant effort for any individual or collective connection of said actuable transmission to said knee, saddle, or table.

6. In a milling machine having a tool spindle and a work table movable relative thereto, a prime mover, means for connecting said prime mover to drive said work spindle, means for applying power from said prime mover to actuate said work table at a rapid traverse and a feed rate, means for reversibly connecting or disconnecting said last-mentioned means relative to said table, a common control means for rendering both of said last two-mentioned means effective, and combined mechanical and fluid pressure operated load-and-fire detent mechanism for positioning said common control means in any of its selected positions.

7. In a milling machine having a tool spindle and a work table movable relative thereto, a prime mover, means for connecting said prime mover to drive said work spindle, means for applying power from said prime mover to actuate said work table at a rapid traverse and a feed rate, means for reversibly connecting or disconnecting said last-mentioned means relative to said table, fluid pressure operating means to render the means for applying power from the prime mover to the work table effective, mechanical operating means to render the reversible connecting and disconnecting means effective, common control means including a single operating lever for said fluid pressure and mechanical operating means, and combined mechanical and fluid pressure operated detent mechanism for positioning said common control means in any of its selected positions.

8. In a milling machine having a tool spindle and a work table movable relative thereto, a prime mover, means for connecting said prime mover to drive said work spindle, means for applying power from said prime mover to actuate said work table at a rapid traverse and a feed rate, means for reversibly connecting or disconnecting said last-mentioned means relative to said table, fluid pressure operating means to render the means for applying power from the prime mover to the work table effective, mechanical operating means to render the reversible connecting and disconnecting means effective, a common single lever control means for said fluid pressure and mechanical operating means, combined mechanical and fluid pressure operated detent mechanism for positioning said common control means in any of its selectable positions, and actuable means associated with said single lever control means rendered effective by the movement of said table to automatically move said control means to any of its selectable positions.

9. In a milling machine having knee, saddle, and table members, a prime mover providing rapid and slow driving power, and means for actuating said knee, saddle, and table members at a rapid traverse and a feed rate comprising an actuable transmission, an individual connecting and disconnecting means associated with said knee, saddle, and table for separately or collectively interconnecting said machine members to said actuable transmission, means for directly connecting or disconnecting the rapid driving power from said prime mover to said actuable transmission, means for connecting the slow driving power to said transmission from said prime mover, including mechanism automatically operable to render said slow drive ineffective when the rapid direct drive of said prime mover is operating, fluid pressure control means for rendering said rapid driving power connection operative or inoperative, a common operating means for rendering said fluid pressure control means and the individual connecting and disconnecting means associated with the table operable, a separate control means for each of the individual connecting and disconnecting means associated with the knee and the saddle, a second fluid pressure control means for actuating said rapid drive connecting or disconnecting means, and a third remote fluid pressure operated control means for actuating said second-mentioned fluid pressure control means, and fluid pressure interconnecting means between all of said mentioned fluid pressure control means whereby any of said fluid pressure control means may be operated simultaneously or individually with uniform effort for each of the fluid pressure control means for any individual or combined actuation of said knee, saddle, and table.

10. In a milling machine having a plurality of work carrying members and a tool spindle, means for actuating said members at feed and rapid traverse rates relative to said tool spindle including a power driven shaft, a feed and rapid traverse transmission driven by said shaft, a rapid traverse clutch for connecting or disconnecting said rapid traverse transmission relative to said shaft, a common output for said feed and rapid traverse transmission, an overrunning clutch interconnected between said feed transmission and said output shaft, a series of branch transmissions between said common output and said work carrying members, motion interrupting means associated with each of said branch transmissions, a fluid operated shifter for said rapid traverse clutch having a control valve therefor, means to trip operate said valve from the movement of one of said work carrying members, and a second control valve having connections through the first-mentioned valve to effect operation of said rapid traverse clutch.

11. In a milling machine having a plurality of work carrying members and a tool spindle, means for actuating said members at feed and rapid traverse rates relative to said tool spindle including a power driven shaft, a feed and rapid traverse transmission driven by said shaft, a rapid traverse clutch for connecting or disconnecting said rapid traverse transmission relative to said shaft, a common output for said feed and rapid traverse transmission, an overrunning clutch interconnected between said feed transmission and said output shaft, a series of branch transmissions between said common output and said work carrying members, motion interrupting means associated with each of said branch transmissions, a fluid operated shifter for said rapid traverse clutch having a control valve therefor, means to trip operate said valve from the movement of one of said work carrying members, a second control valve having connections through the first-mentioned valve to effect operation of said rapid traverse clutch, a third remote valve for actuating said second control valve by fluid pressure, and hydraulic detent means associated with said first-mentioned control valve.

12. In a milling machine having an actuable member for effecting relative movement of work and tool and power means for actuating said member, a clutch for applying or disconnecting said power means relative to said member, a fluid pressure actuable means for operating said clutch, a source of fluid pressure, a main control valve, a second remote control valve, means connecting said source of fluid pressure to said second valve, fluid pressure interconnecting means between said valves, fluid pressure connecting means from said main valve to the fluid presure actuable means for said clutch, and fluid pressure connecting means between said second-mentioned valve and said fluid pressure actuable means for said clutch whereby either of said valves may be operated independently or simultaneously without causing inadvertent operation of said machine.

13. In a milling machine having an actuable member for effecting relative movement of work and tool and power means for actuating said member, a clutch for applying or disconnecting said power means relative to said member, a fluid pressure actuable means for operating said clutch, a source of fluid pressure, a main control valve, a second remote control valve, a third remote control valve, means connecting said source of fluid pressure to said second and third valves, fluid pressure interconnecting means between said second and main valves whereby said source of fluid pressure is connected to said main valve through said second valve, mechanical means for actuating said main and second valves, fluid pressure interconnecting means between said second and third valves whereby fluid pressure from said source of pressure is transmitted through said third valve to actuate said second valve with fluid pressure, and means for connecting fluid pressure from said main valve and said second valve to said fluid pressure operating means for said clutch.

14. In a milling machine having an actuable member for effecting relative movement of work and tool and power means for actuating said member, a clutch for connecting and disconnecting said power means to said member, fluid pressure means for engaging said clutch to connect said power to said member, fluid pressure means for disengaging said clutch to disconnect power from said member, a main control valve having a normal operative position, a second control valve having a normal operative position, a source of fluid pressure connected to said second valve, fluid pressure conducting means connecting said main valve to the fluid pressure disconnecting means for said clutch, fluid pressure conducting means connecting said second valve to the fluid pressure engaging means for said clutch, and fluid pressure interconnecting means between said valves permitting application of fluid from said source of pressure to the clutch disengaging means when said valves are in normal position while permitting application of said fluid pressure to said clutch engaging means when either one or both of said valves are moved out of their normal positions.

15. In a milling machine having an actuable member for effecting relative movement of work and tool and power means for actuating said member, a clutch for connecting and disconnecting said power means to said member, fluid pressure means for engaging said clutch to connect said power to said member, fluid pressure means for disengaging said clutch to disconnect power from said member, a main control valve having a normal operating position, a second control valve having a normal operative position, a source of fluid pressure connected to said second valve, fluid pressure conducting means connecting said main valve to the fluid pressure disconnecting means for said clutch, fluid pressure conducting means connecting said second valve to the fluid pressure engaging means for said clutch, and fluid pressure interconnecting means between said valves permitting application of fluid from said source of pressure to the clutch disengaging means when said valves are in normal position while permitting application of said fluid pressure to said clutch engaging means when either one or both of said valves are moved out of the normal positions, a third remote control valve having a normal position connected to said source of fluid pressure, and fluid pressure interconnecting means between said third valve and said second valve whereby said second valve may be fluid pressure operated by manipulation of said third valve so that when any one or more of said three valves are moved from their normal positions said fluid pressure means for engaging said clutch will be rendered operative.

LESTER F. NENNINGER.
FRED A. HASSMAN.